United States Patent
Staley et al.

(10) Patent No.: US 6,628,341 B1
(45) Date of Patent: Sep. 30, 2003

(54) CORRECTING INTERLACED VIDEO

(76) Inventors: Clinton A. Staley, 7440 Pinal Ave., Atascadero, CA (US) 93422; Darren Alexander Giles, 21471 Lee Dr., Los Gatos, CA (US) 95033

(*) Notice: Subject to any disclaimer, the term of this patent is extended or adjusted under 35 U.S.C. 154(b) by 376 days.

(21) Appl. No.: 09/672,349

(22) Filed: Sep. 28, 2000

(51) Int. Cl.$^7$ .................................................. H04N 5/21
(52) U.S. Cl. ...................................... 348/607; 348/619
(58) Field of Search ................................ 348/607, 619, 348/448–452, 615, 624, 629, 623, 622, 610, 609; H04N 5/21

(56) References Cited

U.S. PATENT DOCUMENTS

| | | | |
|---|---|---|---|
| 4,646,133 A | * 2/1987 | Blanchard et al. | 348/450 |
| 5,081,532 A | * 1/1992 | Rabii | 348/452 |
| 5,430,487 A | * 7/1995 | Naimpally | 375/240.25 |
| 5,625,421 A | * 4/1997 | Faroudja et al. | 348/607 |
| 5,793,435 A | * 8/1998 | Ward et al. | 348/448 |

* cited by examiner

Primary Examiner—Michael H. Lee
(74) Attorney, Agent, or Firm—Gates & Cooper LLP

(57) ABSTRACT

Correcting deinterlaced video by determining whether the deinterlaced video has comb artifact areas, and correcting the comb artifact areas. The detection of comb artifacts includes comparing the differences in pixel values between adjacent rows with the differences in pixel values of alternate rows. The detection includes calculating comb artifact factors based on the differences, and comparing the median value for a group of pixels with a threshold to determine if there is an comb artifact at the pixel.

29 Claims, 1 Drawing Sheet

CORRECTING INTERLACED VIDEO

BACKGROUND

The invention relates to correcting video artifacts caused by interlacing.

With interlaced video a field of pixels for the odd lines are alternately transmitted with a field of pixels for the even lines. This can result in interlaced comb artifacts for an object in the field of view that has moved several pixels between the time that the odd and even fields were recorded. When the fields are combined into a single progressive frame the moving edge of the object can appear comb-like. Even in full-speed progressive motion display this comb-like artifact is visible as a moving jagged edge where a smooth or motion blurred edge would be expected.

SUMMARY

In one aspect, the invention features, in general, a method of correcting deinterlaced video by determining whether the deinterlaced video has comb artifact areas, and correcting the comb artifact areas.

In another aspect, the invention features, in general, a method of correcting deinterlaced video by determining whether the deinterlaced video has comb artifact areas by calculating a group value based on differences in pixel values between adjacent rows and the differences in pixel values of alternate rows for pixels in a group of pixels and comparing the group value (which could be a median value of factors determined for each pixel) with a threshold, and correcting the comb artifact areas.

Preferred embodiments of the invention may include one or more of the following features. In preferred embodiments the detection of comb artifacts includes comparing the differences in pixel values between adjacent rows with the differences in pixel values of alternate rows. Comb artifact detection also includes calculating the sum of squared differences between a subject pixel and pixels immediately above and below it, and also includes determining the sum of squared differences between the subject pixel and the pixel two rows above and the pixel two rows below it. The comparison can include determining the ratio of the sum of squared differences between a subject pixel and pixels immediately above and below it, and the sum of squared differences between the subject pixel and the pixel two rows above and the pixel two rows below it. Alternatively the comparison can include determining the difference of the sum of squared differences between a subject pixel and pixels immediately above and below it, and the sum of squared differences between the subject pixel and the pixel two rows above and the pixel two rows below it. The ratio or the difference thus determined can be compared with a predetermined (e.g., threshold) value. The ratios or the differences can also be determined for pixels in a group of pixels surrounding the subject pixel, and the ratios or differences (or a median for the ratios or differences) for the group can be compared with a predetermined (e.g., threshold) value. Alternatively, a pixel increment value can be assigned to each pixel of a group of pixels that has a ratio or difference that exceeds a predetermined value, and the sum of the pixel increment values for the group can then be compared with a predetermined value. The pixel increment values for pixels in the group can first be summed for pixels in the same column, and then the sums for each column can be summed for the group. In this way the group of pixels can be moved one column at a time to carry out a group comparison for all pixels in a row. After detecting the existence of comb artifacts, they can be corrected by computing a function based on the values of pixels above and below the subject pixel. The correction can include blending the odd and even fields in a comb artifact area, e.g., giving one-quarter weight to the pixels above and below a subject pixel and ½ to the subject pixel. Alternatively, the correction can include removing one of the fields in the comb artifact and replacing the missing pixel by averaging the pixels immediately above and below it.

In another aspect, the invention features, in general, a system for correcting deinterlaced video that includes a comb artifact detector that receives deinterlaced video and determines whether the deinterlaced video has comb artifact areas, and an artifact corrector responsive to the detector to correct the comb artifact areas and produce corrected video.

In another aspect, the invention features, in general, a program storage media storing computer executable instructions that cause a computer to determine whether deinterlaced video has comb artifact areas, and correct the comb artifact areas.

Embodiments of the invention may include one or more of the following advantages. Comb artifacts are automatically and quickly detected and corrected in deinterlaced video.

Other advantages and features of the invention will be apparent from the following description of an embodiment thereof.

DETAILED DESCRIPTION

Figure 1:
FIG. 1 is the block diagram of a filter for correcting deinterlaced video.

Referring to FIG. 1, there is shown filter 10 for receiving deinterlaced video 14 and providing corrected video 16.

Figure 2:
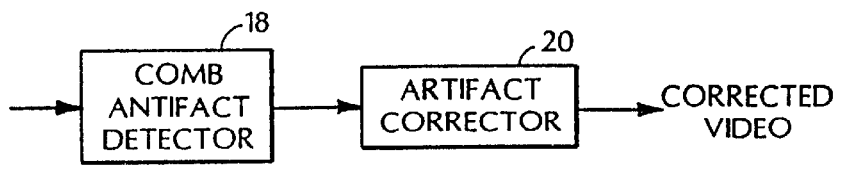
FIG. 2 is the block diagram showing the components of the FIG. 1 filter.

Referring to FIG. 2, it is seen that filter 10 includes comb artifact detector 18 and artifact corrector 20. Filter 10, comb artifact detector 18 and artifact corrector 20 can be implemented by a computer executing instructions on a storage medium.

Figure 3:
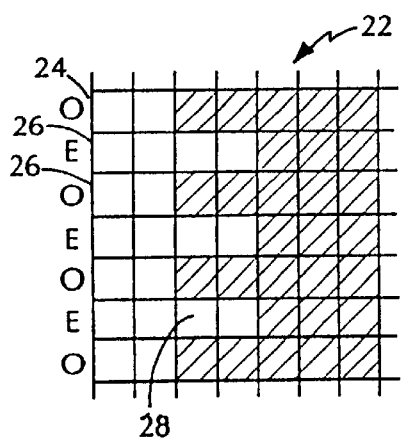
FIG. 3 is a diagram of a deinterlaced field of pixels.
Figure 4:
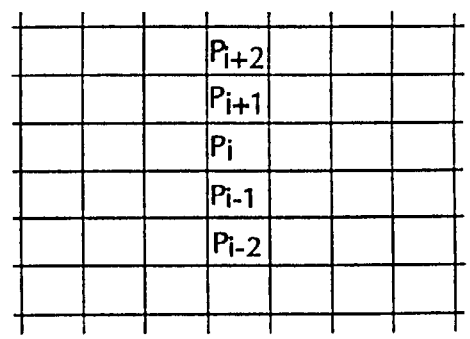
FIG. 4 is a diagram showing a subject pixel and pixels immediately above and below it and pixels two rows above and two rows below it.

Referring to FIG. 3, a portion 22 of a deinterlaced frame is shown. It includes odd lines of pixels 24 and even lines of pixels 26. In this portion of the frame, the moving edge of an object is shown, and it is seen that the even rows of pixels are displaced by two pixels with respect to the odd rows of pixels, resulting in a so-called comb artifact. The edge of an object moving quickly in a horizontal direction across the frame could cause this artifact. Artifacts can also be created by vertical movement, in which case the artifacts are slightly different, with the odd line having an entirely different content than the adjacent even line.

In order to detect the existence of comb artifacts, comb artifact detector 18 determines a comb artifact factor (CAF) for each pixel in a frame and then compares the CAFs. The CAF is computed from pixel values in one or more layers of the image. For example, in the case of RGB, all three layers are used; for YUV, typically only the Y layer will be used. First even and odd differences are computed within each layer; then the differences are summed and squared across several layers. The odd differences are given by:

$$P_{i+1}-P_i \text{ and } P_1-P_{i-1}$$

Where:
$P_i$=the value of the subject pixel.
$P_{i+1}$=the value of the pixel immediately above the subject pixel.
$P_{i-1}$=the value of the pixel immediately below the subject pixel.

The even differences are given by:

$$P_{i+2}-P_i \text{ and } P_i-P_{i-2}$$

Where:
$P_{i+2}$=the value of the pixel two rows above the subject pixel.
$P_{i-2}$=the value of the pixel two rows below the subject pixel.

The sum of the squares of the odd differences, $\Sigma_{odd}$, is given by:

$$\Sigma_{odd}=\Sigma(P_{i+1}-P_i)^2+(P_i-P_{i-1})^2 \text{ for all layers.}$$

The sum of the squares of the even differences, $\Sigma_{even}$, is given by:

$$\Sigma_{even}=\Sigma(P_{i+2}-P_i)^2+(P_i-P_{i-2})^2 \text{ for all layers.}$$

CAF can be computed either as the difference between the sum of the squares of odd and even differences, $CAF_{diff}$, or as the proportion between them, $CAF_{prop}$, as indicated by the formulas below:

$CAF_{diff}=\Sigma_{odd}-\Sigma_{even}$
$CAF_{prop}=\Sigma_{odd}/\Sigma_{even}$

The CAF determines the likelihood that the subject pixel is part of a comb-artifact. In a highly textured area, both odd and even differences will be high; in a uniform area, both will be low. In either case, the CAF is generally low. In the comb-artifact area, the odd differences are much higher than the even differences, and the CAF is high. The sensitivity of the detection is adjusted by setting a threshold CAF above which a comb-artifact is detected. Artifact correction then takes place for subject pixels with a CAF above that threshold. Typical threshold values for $CAF_{diff}$ might fall between 500 and 1000. Reasonable thresholds for $CAF_{prop}$ might be 1.5–4.

Because pixels in an image can potentially have high CAFs by random chance, a further refinement of the technique is employed to avoid false-positives. For each subject pixel, comb artifact detector 18 calculates the median of the subject pixel CAF and the CAFs of a small pixel neighborhood surrounding the subject pixel. The pixel neighborhood can include all adjacent pixels, or it can include all pixels spaced by two rows or columns. The median value is then compared to the threshold CAF. A 50 percent median value can be employed; alternatively a "median" different than 50 percent can be chosen to provide a further parameter for adjusting sensitivity.

To quickly determine whether the median of CAFs for a rectangular neighborhood of pixels falls above or below a threshold, each pixel is assigned a pixel increment value of 1 if its CAF is above the threshold, otherwise a value of 0. The increment values of all pixels in the rectangular neighborhood are then totaled to arrive at a neighborhood increment value (NIV). If the NIV is above 50% of the number of pixels in the neighborhood, then the median of the CAFs for that neighborhood is above the threshold. Once again, a value other than 50% can be used to adjust sensitivity.

Figure 5:
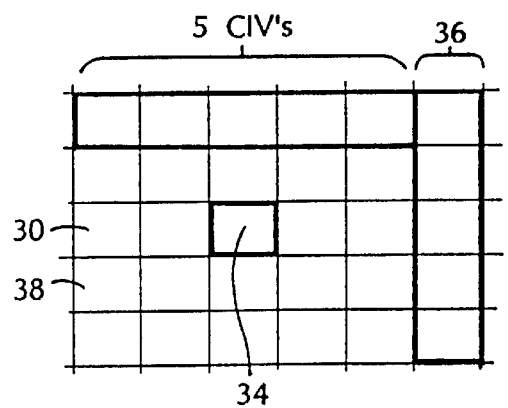
FIG. 5 is a diagram showing a 5×5 neighborhood of pixels that is advanced along a row of pixels.

Finding the NIV can be accelerated, and its speed made independent of the size of the neighborhood, by appropriate subtotaling of pixel increment values. FIG. 5 illustrates determining the NIV for 5×5 neighborhoods for row 30. Column increment values (CIV) comprising the sum of the pixel increment values for columns of 5 pixels along the entire length of row 30 are calculated and maintained. Column 32 is an example. To determine the total of pixel increments in the 5×5 neighborhood of e.g. pixel 34, the 5 CIVs for the columns surrounding pixel 34 are totaled, arriving at a NIV for pixel 34.

From the NIV for pixel 34, the NIV of pixel 36, immediately to the right, is determined by subtracting the CIV for column 32, and adding the CIV for column 36. Assuming all CIVs for row 30 are already computed, the NIVs for all pixels in row 30 are computed by repeatedly subtracting the leftmost CIV and adding the next CIV to the right.

After computing NIVs for row 30, detector 18 advances to the next row, labeled 38. The CIVs for row 38 are incrementally computed from the CIVs for row 30 by subtracting the pixel increment value from the top of each CIV and adding a new pixel increment value at the bottom. Detector 18 then uses these adjusted CIVs to compute NIVs for row 38.

By computing NIVs and CIVs in this incremental fashion, detector 18 reduces the computations necessary for all but the topmost and leftmost NIVs to a total of two additions and two subtractions, regardless of the neighborhood size for which it is computing NIV's. As noted above, a comb artifact is identified by a NIV greater than 50% (or other specified %).

After artifact detector 18 has detected artifacts, the artifacts are corrected at artifact corrector 20. Artifact corrector 20 can correct for artifacts by blending the odd and even fields in comb artifact areas during deinterlacing. For example, the blending can include giving one-quarter weight to the pixels above and below a subject pixel and ½ weight to the subject pixel. Alternatively artifact corrector 20 can remove one of the fields in the comb artifact area and replace the missing pixel by averaging the pixels immediately above and below it. For example, if the even field is being eliminated from FIG. 3, and, assuming that white pixel 28 in the even field has a CAF above a threshold (as identified by a marker), pixel 28 could be replaced with e.g.:

a) an average of the odd-field pixels above and below,
b) 0.5 of the value of pixel 28, plus 0.25 of the values of the pixels above and below 28,
c) a so-called Lanczos interpolation (which is well known in the art) using several pixels from the odd frame above and below pixel 28, or
d) an average of the Lanczos interpolation and the original value for pixel 28.

Filter 10 thus automatically detects and removes comb artifacts from deinterlaced video.

Other embodiments of the invention are within the scope of the appended claims.

What is claimed is:
1. A method of correcting deinterlaced video comprising:
(a) determining whether the deinterlaced video has comb artifact areas, wherein the determining comprises:

(i) determining a ratio of or a difference between the differences in pixel values between adjacent rows and the differences in pixel values of alternate rows;
(ii) calculating the sum of squared differences between a subject pixel and pixels immediately above and below it;
(iii) determining the sum of squared differences between the subject pixel and the pixel two rows above and the pixel two rows below it, and
(b) correcting the comb artifact areas.

2. The method of claim 1 wherein said comparing includes determining the ratio of the sum of squared differences between a subject pixel and pixels immediately above and below it, and the sum of squared differences between the subject pixel and the pixel two rows above and the pixel two rows below it.

3. The method of claim 1, wherein said comparing includes determining the difference of the sum of squared differences between a subject pixel and pixels immediately above and below it, and the sum of squared differences between the subject pixel and the pixel two rows above and the pixel two rows below it.

4. The method of claim 2 wherein said comparing includes comparing said ratio with a predetermined value.

5. The method of claim 3 wherein said comparing includes comparing said difference with a predetermined value.

6. The method of claim 4 wherein said comparing includes determining said ratio for a subject pixel and the pixels adjacent to it and taking the median value of said ratios for the pixel and adjacent pixels, and comparing said median value with a predetermined value.

7. The method of claim 5 wherein said comparing includes determining said difference for a subject pixel and the pixels adjacent to it and taking the median value of said ratios for the pixel and adjacent pixels, and comparing said medican value with a predetermined value.

8. The method of claim 4 wherein said comparing includes determining said ratio for each pixel of a group of pixels including pixels adjacent to a subject pixel and taking the median value of said ratios for said group of pixels, and comparing said median value with a predetermined value.

9. The method of claim 5 wherein said comparing includes determining said difference for each pixel of a group of pixels including pixels adjacent to a subject pixel and taking the median value of said ratios for said group of pixels, and comparing said median value with a predetermined value.

10. The method of claim 4 wherein said comparing includes assigning a pixel increment for each pixel of a group of pixels where said ratio for that pixel exceeds said predetermined value, and summing said pixel increment values for said group to obtain a summed value that is compared with said predetermined value.

11. The method of claim 4 wherein said comparing includes assigning a pixel increment value for each pixel of a group of pixels where said difference for that pixel exceeds said predetermined value, and summing said pixel increment values for said group to obtain a summed value that is compared with said predetermined value.

12. The method of claim 10 wherein said summing involves summing the pixel increment values for pixels in said group in the same column and then summing the values for each column in the group, and incrementally moving said group one column at a time to do said comparison for pixels in a row.

13. The method of claim 11 wherein said summing involves summing the pixel increment values for pixels in said group in the same column and then summing the values for each column in the group, and incrementally moving said group one column at a time to do said comparison for pixels in a row.

14. The method of claim 1 wherein said correcting includes computing a function based on the values of pixels above and below the subject pixel.

15. The method of claim 1 wherein said correcting includes blending the odd and even fields in a comb artifact area.

16. The method of claim 15 wherein said blending includes giving one-quarter weight to the pixels above and below a subject pixel and ½ weight to the subject pixel.

17. The method of claim 1 wherein said correcting includes removing one of the fields in the comb artifact and replacing the missing pixel by averaging the pixels immediately above and below it.

18. A system for correcting deinterlaced video comprising
(a) a comb artifact detector that received said deinterlaced video and determines whether the deinterlaced video has comb artifact areas, wherein the detector:
(i) compares the differences in pixel values between adjacent rows with the differences in pixel values of alternate rows of a frame of said video;
(ii) calculates the sum of squared differences between a subject pixel and pixels immediately above and below it; and
(iii) calculates the sum of squared differences between the subject pixel and the pixel two rows above and the pixel two rows below it, and
(b) an artifact corrector responsive to said detector to correct said comb artifact areas and produce corrected video.

19. The system of claim 18 wherein said detector determines the ratio of the sum of squared differences between a subject pixel and pixels immediately above and below it, and the sum of squared differences between the subject pixel and the pixel two rows above and the pixel two rows below it.

20. The system of claim 18 wherein said detector determines the difference of the sum of squared differences between a subject pixel and pixels immediately above and below it, and the sum of squared differences between the subject pixel and the pixel two rows above and the pixel two rows below it.

21. The system of claim 19 wherein said detector compares said ratio with a predetermined value.

22. The system of claim 20 wherein said detector compares said difference with a predetermined value.

23. A program storage media storing computer executable instructions, the instructions to cause a computer to
(a) determine whether deinterlaced video has comb artifact areas, wherein said instruction to determine causes the computer to:
(i) compare the differences in pixel values between adjacent rows with the differences in pixel values of alternate rows
(ii) calculate the sum of squared differences between a subject pixel and pixels immediately above and below it;
(iii) determine the sum of squared differences between the subject pixel and the pixel two rows above and the pixel two rows below it, and
(b) correct the comb artifact areas.

24. The media of claim 23 wherein said instruction to determine causes the computer to determine the ratio of the sum of squared differences between a subject pixel and pixels immediately above and below it, and the sum of squared differences between the subject pixel and the pixel two rows above and the pixel two rows below it.

25. The media of claim 23 wherein said instruction to determine causes the computer to determine the difference of the sum of squared differences between a subject pixel and pixels immediately above and below it, and the sum of squared differences between the subject pixel and the pixel two rows above and the pixel two rows below it.

26. The media of claim 24 wherein said instruction to determine causes the computer to compare said ratio with a predetermined value.

27. The media of claim 25 wherein said instruction to determine causes the computer to compare said difference with a predetermined value.

28. A method of correcting deinterlaced video comprising:

determining whether the deinterlaced video has comb artifact areas by calculating a group value based on difference in pixel values between adjacent rows and the differences in pixel values of alternate rows for pixels in a group of pixels and comparing said group value with a threshold, wherein said determining includes calculating, for each pixel in the group, the sum of squared differences between a subject pixel and pixels immediately above and below it, and also includes determining the sum of squared differences between the subject pixel and the pixels two rows above and the pixels two rows below it; and correcting the comb artifact areas.

29. The method of claim 28 wherein said determining includes calculating, for each pixel in the group, a factor based on differences in pixel values between adjacent rows and the differences in pixel values of alternate rows, and taking a median value of said factors for said group of pixels, and wherein said group value is said median value.

* * * * *

UNITED STATES PATENT AND TRADEMARK OFFICE
CERTIFICATE OF CORRECTION

PATENT NO. : 6,628,341 B1
DATED : September 30, 2003
INVENTOR(S) : Clinton A. Staley and Darren A. Giles It is certified that error appears in the above-identified patent and that said Letters Patent is hereby corrected as shown below:

<u>Title page,</u>
Item [57], ABSTRACT,
Line 9, "an" should read -- a --.

<u>Column 5,</u>
Line 49, after "increment" insert -- value --.

<u>Column 6,</u>
Line 45, "19" should read -- 18 --.

Signed and Sealed this

Thirtieth Day of March, 2004

JON W. DUDAS
*Acting Director of the United States Patent and Trademark Office*